US012075249B2

(12) United States Patent
Mahamkali

(10) Patent No.: US 12,075,249 B2
(45) Date of Patent: Aug. 27, 2024

(54) CONTROLLING WI-FI TRAFFIC FROM NETWORK APPLICATIONS WITH CENTRALIZED FIREWALL RULES IMPLEMENTED AT THE EDGE OF A DATA COMMUNICATION NETWORK

(71) Applicant: Fortinet, Inc., Sunnyvale, CA (US)

(72) Inventor: Ravikiran Mahamkali, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 173 days.

(21) Appl. No.: 17/013,802

(22) Filed: Sep. 7, 2020

(65) Prior Publication Data
US 2022/0078619 A1 Mar. 10, 2022

(51) Int. Cl.
| | |
|---|---|
| *H04W 12/088* | (2021.01) |
| *H04L 9/40* | (2022.01) |
| *H04W 12/121* | (2021.01) |
| *H04W 28/02* | (2009.01) |
| *H04W 48/02* | (2009.01) |

(52) U.S. Cl.
CPC ....... *H04W 12/088* (2021.01); *H04L 63/0263* (2013.01); *H04W 12/121* (2021.01); *H04W 28/0215* (2013.01); *H04W 48/02* (2013.01)

(58) Field of Classification Search
CPC ............ H04L 63/0263; H04W 12/088; H04W 12/121; H04W 28/0215; H04W 48/02; H04W 88/12
USPC .......................................................... 716/1
See application file for complete search history.

(56) References Cited

U.S. PATENT DOCUMENTS

| | | | | |
|---|---|---|---|---|
| 9,929,907 | B2* | 3/2018 | Scahill | H04J 11/0023 |
| 9,998,248 | B2* | 6/2018 | Scahill | H04W 8/26 |
| 10,055,231 | B1* | 8/2018 | Li | G06F 9/5077 |
| 10,320,825 | B2* | 6/2019 | Mermoud | H04L 63/145 |
| 10,432,463 | B2* | 10/2019 | Likar | H04L 41/0889 |
| 10,492,211 | B2* | 11/2019 | Lee | H04W 72/0446 |
| 10,581,883 | B1* | 3/2020 | Syme | H04L 63/1416 |
| 10,944,650 | B2* | 3/2021 | Shanbhag | H04L 43/028 |
| 11,057,346 | B2* | 7/2021 | Woolfe | H04L 49/25 |
| 11,063,906 | B2* | 7/2021 | Whittle | H04L 63/1416 |
| 11,244,043 | B2* | 2/2022 | Marwah | H04L 63/1425 |
| 11,394,722 | B2* | 7/2022 | Price | G06F 21/6245 |
| 2014/0071967 | A1* | 3/2014 | Velasco | H04L 12/1403 |
| | | | | 370/338 |
| 2016/0112903 | A1* | 4/2016 | Kaushik | H04L 41/0896 |
| | | | | 370/235 |
| 2017/0244740 | A1* | 8/2017 | Mahabir | H04L 63/1433 |

(Continued)

*Primary Examiner* — Venkat Perungavoor
*Assistant Examiner* — Peiliang Pan
(74) *Attorney, Agent, or Firm* — Law Office of Dorian Cartwright; Dorian Cartwright

(57) ABSTRACT

Application data collected by an IDS (intrusion detection system) on the data communication network and concerning applications executing on stations coupled to the plurality of access points, is received. Additionally, firewall rules for applications from a firewall device coupled to the data communication network and providing firewall services to the plurality of access points, including outbound traffic from the plurality of access points, are received. The firewall rules can be parsed to expose configured actions for applications. A customized application control policy is prepared for each particular application for implementation on the network edge by at least one of the plurality of access points.

12 Claims, 4 Drawing Sheets

(56) References Cited

U.S. PATENT DOCUMENTS

| | | | |
|---|---|---|---|
| 2018/0083791 A1* | 3/2018 | Shanbhag | H04L 43/20 |
| 2018/0183662 A1* | 6/2018 | Likar | H04L 41/0883 |
| 2018/0191766 A1* | 7/2018 | Holeman | H04L 63/20 |
| 2019/0036960 A1* | 1/2019 | Cullison | H04L 63/1433 |
| 2019/0124109 A1* | 4/2019 | Foster | G06Q 50/01 |
| 2019/0228863 A1* | 7/2019 | Dharwad | G16H 40/40 |
| 2019/0311430 A1* | 10/2019 | Raleigh | H04W 4/24 |
| 2020/0322369 A1* | 10/2020 | Raghuramu | H04L 63/1433 |

\* cited by examiner

CONTROLLING WI-FI TRAFFIC FROM NETWORK APPLICATIONS WITH CENTRALIZED FIREWALL RULES IMPLEMENTED AT THE EDGE OF A DATA COMMUNICATION NETWORK

FIELD OF THE INVENTION

The invention relates generally to computer networking security, and more specifically, to controlling Wi-Fi traffic from network applications with centralized firewall rules implemented at the edge of a data communication network.

BACKGROUND

Firewalls often contain networking hardware which is slower than the internet pipes they are connected to. Adding a firewall to the data center architecture can cause significant bottlenecks when bursts of traffic occur. In theory, faster hardware can help to solve this, but because firewalls must buffer the traffic and filter packets, so there will always be additional latency when using additional hardware.

One of the reasons for slowness comes from the fact that a chain of rules and policies which needs to be applied. However, because of the lack of integration between firewalls and other network infrastructure in a local access network, firewalls take on the brunt of workload. The firewall can become a problematic bottleneck for a local access network.

Therefore, what is needed is a robust technique for controlling Wi-Fi traffic from network applications with centralized firewall rules implemented at the edge of a data communication network.

SUMMARY

These shortcomings are addressed by the present disclosure of methods, computer program products, and systems for controlling Wi-Fi traffic from network applications with centralized firewall rules implemented at the edge of a data communication network.

In one embodiment, application data collected by an IDS (intrusion detection system) on the data communication network and concerning applications executing on stations coupled to the plurality of access points, is received. Additionally, firewall rules for applications from a firewall device coupled to the data communication network and providing firewall services to the plurality of access points, including outbound traffic from the plurality of access points, are received. The firewall rules can be parsed to expose configured actions for applications.

In another embodiment, a customized application control policy is prepared for each particular application for implementation by at least one of the plurality of access points. The customized application policy concerns how the at least one access point prioritizes network traffic for DPI (deep packet inspection) for data packets for a specific application of a station based on the firewall rules and application data for the specific application.

The customized application control policies are distributed to the plurality access points based on application traffic handled by each access point. Policies can also be implemented at the Wi-Fi controller.

Advantageously, network performance is improved with better network security and by dropping packets early in the processing. Furthermore, loads on networking devices is reduced.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for controlling Wi-Fi traffic from network applications with centralized firewall rules implemented at the edge of a data communication network. One of ordinary skill in the art will recognize many additional variations made possible by the succinct description of techniques below.

Figure 1:
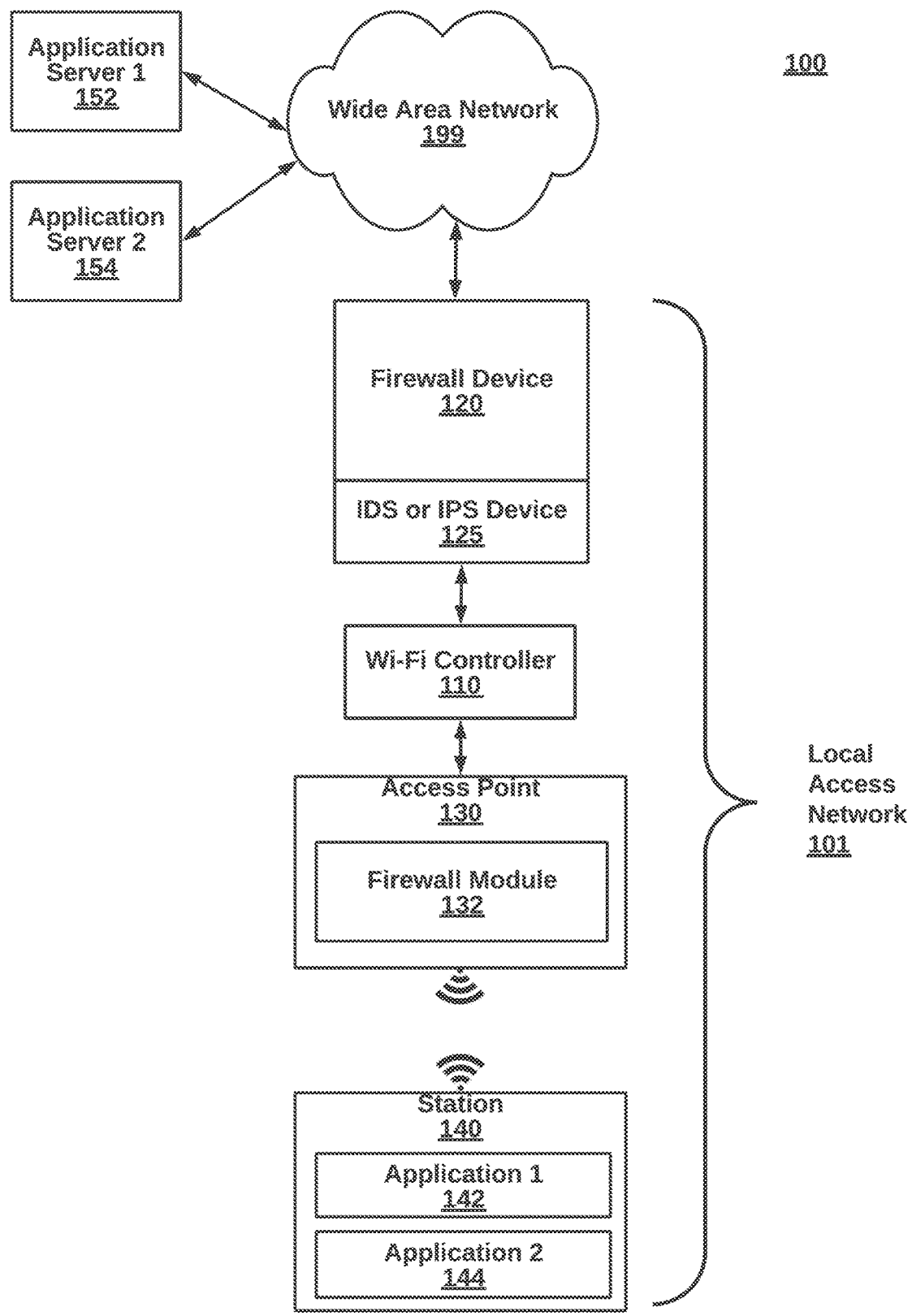
FIG. 1 is a high-level block diagram illustrating a system for controlling Wi-Fi traffic from network applications with centralized firewall rules implemented at the edge of a data communication network, according to one embodiment.
Figure 2:
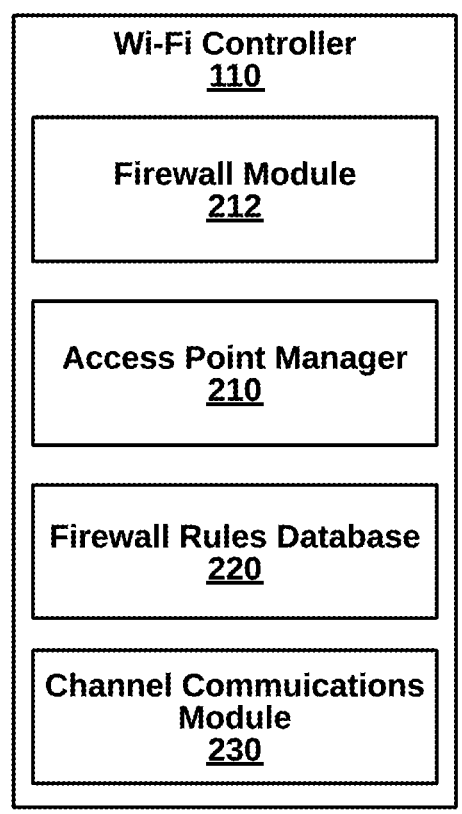
FIG. 2 is a more detailed block diagram illustrating an access point of the system of FIG. 1, respectively, according to one embodiment.

Systems for Edge Firewall Control of Network Applications (FIG. 1-2)

FIG. 1 is a high-level block diagram illustrating a system 100 for controlling Wi-Fi traffic from network applications with centralized firewall rules implemented at the edge of a data communication network, according to one embodiment. The system 100 includes a Wi-Fi controller 110, a firewall device 120, an access point 130, and stations 140, coupled through a wide area network 199. Many other embodiments are possible, for example, with more access points, more or fewer stations, additional components, such as firewalls, routers, switches, and the like. Hardware and software components can be implemented similar to the example of FIG. 4.

The wide area network 199 links components of the system 100 with a channel for data communication. The Wi-Fi controller 110, the firewall device 120, and the access point 130 are preferably connected to the wide area network 199 via hardwire. The stations 140 are wirelessly connected to the access point 130 to access the wide area network 199 indirectly. The wide area network 199 can be a data communication network such as the Internet, a WAN, a LAN, can be a cellular network, or a hybrid of different types of networks. Thus, the system 100 can be a LAN or include cloud-based devices.

In one embodiment, the Wi-Fi controller 110 distributes application rules to access points based on firewall rules. In another embodiment, application rules are based in combination with application information, such as real-time data captured by an IPS (intrusion prevention system). These rules are executed by access points at the edge of wireless traffic (e.g., Wi-Fi or Bluetooth) for specific applications.

Customized application control policies are prepared for each access point. In one embodiment, these are light versions of firewalls optimized for a specific network location, such as an access point. Policies can be updated when updated inputs are provided. Using statistics for applications collected by centralized network, over more than one station, allows a set of rules to be suggested by artificial intelligence or other mechanisms. The policies are prepared on a per-application basis, and in some cases, a per-access point basis. More details for the Wi-Fi controller 110 are set forth below with respect to FIG. 2.

The firewall device 120 centralizes network security by examining data packets entering or leaving a LAN or enterprise network from the wide area network 199. The firewall device 120 can implement network policies by limiting or banning certain applications, for example. Any data packets being sent to an application server for a banned application can be dropped to prevent communications.

The firewall device 120 is associated with an IPS (intrusion prevention system) or IDS (intrusion detection system) device 125. The IPS device 125 sends application information collected through security processing at the firewall device 120, to the Wi-Fi controller 110. The application information is parsed from streams of data packets headed in and out of a LAN, in one example. More generally, the IPS device prevents malicious activity within a network. Some embodiments of the IPS are integrated with an IDS.

The access point 130 includes a firewall module 132 as the link to distributing network security to the edge. Packets are scrutinized with firewall policies upon entering the LAN or enterprise network airborne from the Wi-Fi network. As a result, data packets can be dropped at the edge without being forwarded from the access point 130 to the firewall device 120, where the packet would ultimately be dropped. For instance, data packets from low risk applications can be dropped. Additionally, data packets from certain categories, or certain languages, can be dropped.

Airtime prioritization can be provided to organizations by the access point 130 by advancing certain data packets in the DPI processing queue. The firewall rules thus can affect priority of network processing at edge devices. Trusted applications, popular applications, or native language applications can be treated better. In one embodiment, artificial intelligence can manage trust relationships and adjust corresponding airtime guarantees.

In one example, Web-filter is a mechanism of blocking/monitoring a particular URL. The Wi-Fi controller 110 fetches the web-filter policies from the firewall device 120 and customizes them for deployment to one more applicable access points. In this example, a website/URL can be blocked at edge level itself, instead of allowing flight through the local access network to the firewall device 120. Also firewall rules can stop blacklisted stations from reaching the back end network.

The stations 140 include applications 145 executing on a processor and using network services. The applications can be tracked by the IDS and, as a result, determined to be low risk or high risk applications. Example applications include Facebook, Chrome browser, a banking application, a word processor storing documents on the cloud, and a multiplayer video game.

Application 1 142 and application 2 144 are identified when the station 140 registers with the access point 130 and specific firewall rules for application 1 142 and application 2 144 are retrieved from the firewall device 120 by the Wi-Fi controller 110. In one case, the firewall device 120 or the IDS or IPS device 125 sniffs packets leaving the local area network 101 and recognizes traffic headed to application server 1 152 and application server 2 154. Application servers can be identified by known IP addresses, or by unique characteristics used to fingerprint applications for identification. The firewall rules can be categorized by, for example, source entity, destination entity, protocol, and time of day. The source entity can be according to a device type like an iPhone versus a desktop PC, a source MAC, an IP address, a source port, or an end user.

Specific firewall rules are applied to the network packet being examined based on the identified application. For example, priority can be increased or decreased based on firewall rules, before DPI processing. This optimization of data packet processing in turn provides better network performance. In one embodiment, Wi-Fi Multimedia Quality of Service (WMM QoS) prioritizes wireless voice and video traffic over the WiFi link, out of the four access categories: voice, video, best effort, and background. The QoS priority value of the packets belonged to an application which is identified as high risk, can be reduced, so that they are starved in a low priority queue. For example, the voice/video packets usually have high QoS priority, but if they belong to a high risky application, then the QoS priority value can be reduced such that they are starved in a low priority queue.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating the Wi-Fi controller 110 of the system of FIG. 1, respectively, according to one embodiment. The Wi-Fi controller 110 comprises an access point manager 210, a firewall rules database 220, an AP firewall rules engine 230, and a network communication module 240. The components can be implemented in hardware, software, or a combination of both.

The access point manager 210 manages the access point 140 and a plurality of access points on the network. SSIDs can be assigned to and unassigned from an access point. Stations can be handed-off from one access point to another access point. In one embodiment, the access point manager 210 coordinates messages to send firewall rules and customized application control policies to access points.

The firewall rules database 220 can store firewall rules along with relevancy scores, associated applications and stations storing the applications. The firewall rules can be stored in a structured manner according to an identifier. A record can be created and maintained for each application. Identifiers of firewall rules can be added to each appropriate application record.

The AP firewall rules engine 230 inputs application data info from the IPS and IDS, and also firewall rules from the firewall device. On a per-application basis, a policy is developed for application at the edge by an access point. One embodiment concerns traffic received from wireless stations headed upstream to the firewall device, as this traffic can be eliminated by dropping packets at the access point. Another embodiment further customizes a policy for a particular access point, such as device type, software type and versions, usage statistics, connected stations, and the like.

The network communication module 240 can provide network protocol services and lower layer services for packetizing data according to Ethernet or other protocols. The network communication module 240 can include transceivers with modulators, antennae and drivers to exchange data with a physical medium. An operating system can interface applications executing on stations with network services.

II. Methods for Edge Firewall Control of Network Applications (FIG. 3)

Figure 3:
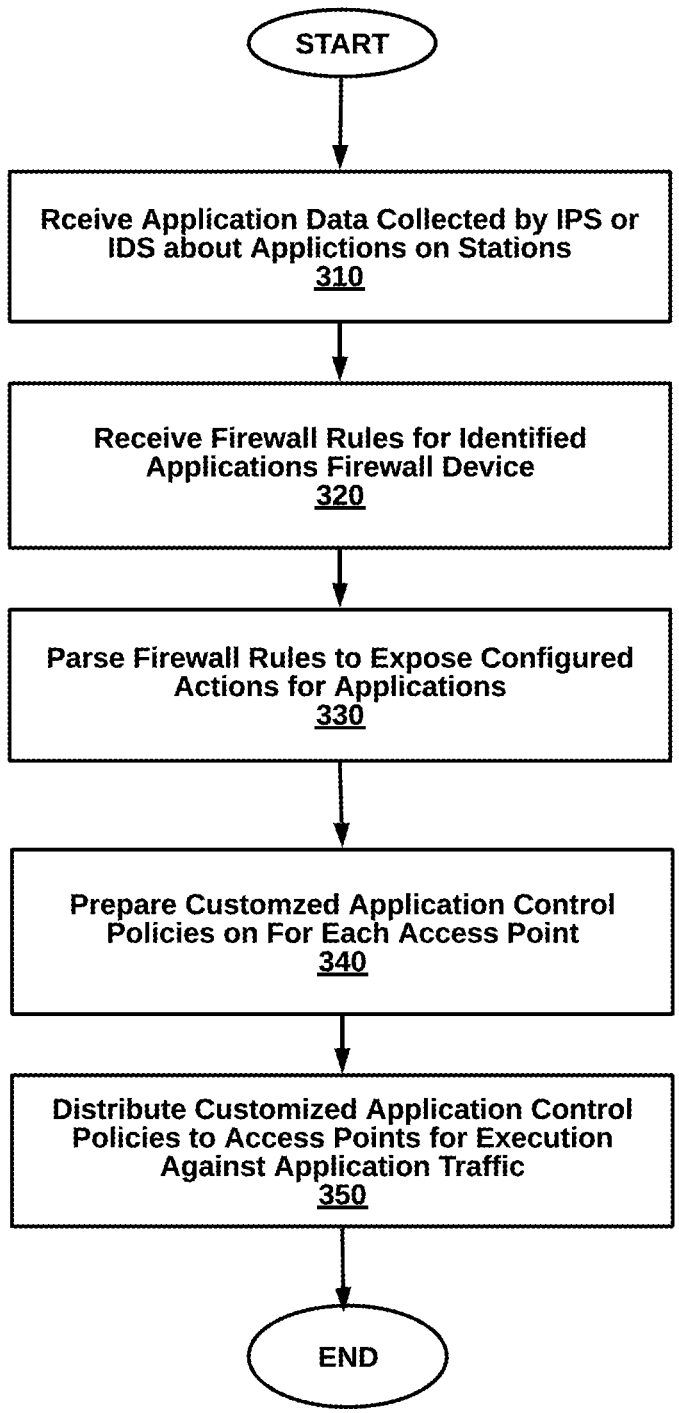
FIG. 3 is a high-level flow diagram illustrating a method for controlling Wi-Fi traffic from network applications with centralized firewall rules implemented at the edge of a data communication network, according to one embodiment.

FIG. 3 is a high-level flow diagram illustrating a method for controlling Wi-Fi traffic from network applications with centralized firewall rules implemented at the edge of a data communication network, according to one embodiment. The method 300 can be implemented, for example, by the system 100 of FIG. 1. The steps are merely representative groupings of functionality, as there can be more or fewer steps, and the steps can be performed in different orders.

At step 310, application data collected by an IPS or an IDS (intrusion detection system) on the data communication network and concerning applications executing on stations coupled to the plurality of access points, is received. The application data can concern risk level, language or popularity of an application, for example. Statistics can be collected by monitoring data packets inbound and outbound from a LAN.

At step 320, firewall rules for identified applications from a firewall device coupled to the data communication network and providing firewall services to the plurality of access points, including outbound traffic from the plurality of access points, are received. In one embodiment, a firewall device has firewall daemons at a Wi-Fi controller and access points for synching and compatibility. Application data and firewall rules can be pushed from components or pulled with a specific request from a Wi-Fi controller. One embodiment sends rules from a firewall device directly to access points without Wi-Fi controller involvement.

At step 330, the firewall rules are parsed to expose configured actions for applications. In one embodiment, a firewall daemon on a Wi-Fi controller is synched with a firewall device, for compatibility. The rules can be listed in a spreadsheet or XML format, for example.

At step 340, a customized application control policy for each particular application for implementation by at least one of the plurality of access points, is prepared. The customized application policy concerns how the at least one access point prioritizes network traffic for DPI for data packets for a specific application of a station based on the firewall rules and application data for the specific application. Relevant rules for an application or for an access point are identified, such as risk or popularity of a particular application. Other rules include URL blocking, application blocking, and blacklisted stations.

At step 350 customized application control policies are distributed to the plurality access points based on application traffic handled by each access point. Wi-Fi controllers are an ideal point of distribution given the control over all access points and stations within an enterprise network. Applications first contact the network at the access point and firewall rules applied at this time are best positioned to avoid further burden on the local area network. Application traffic can be dropped at the edge without the need for flight across the local area network to a firewall device to meet the same fate. Applications can be handled differently by different access points, for example when one application is operating in a congested part of the Wi-Fi network. Other policies are implemented by a network administrator, for example, to manually prioritize applications.

III. Generic Computing Device (FIG. 4)

Figure 4:
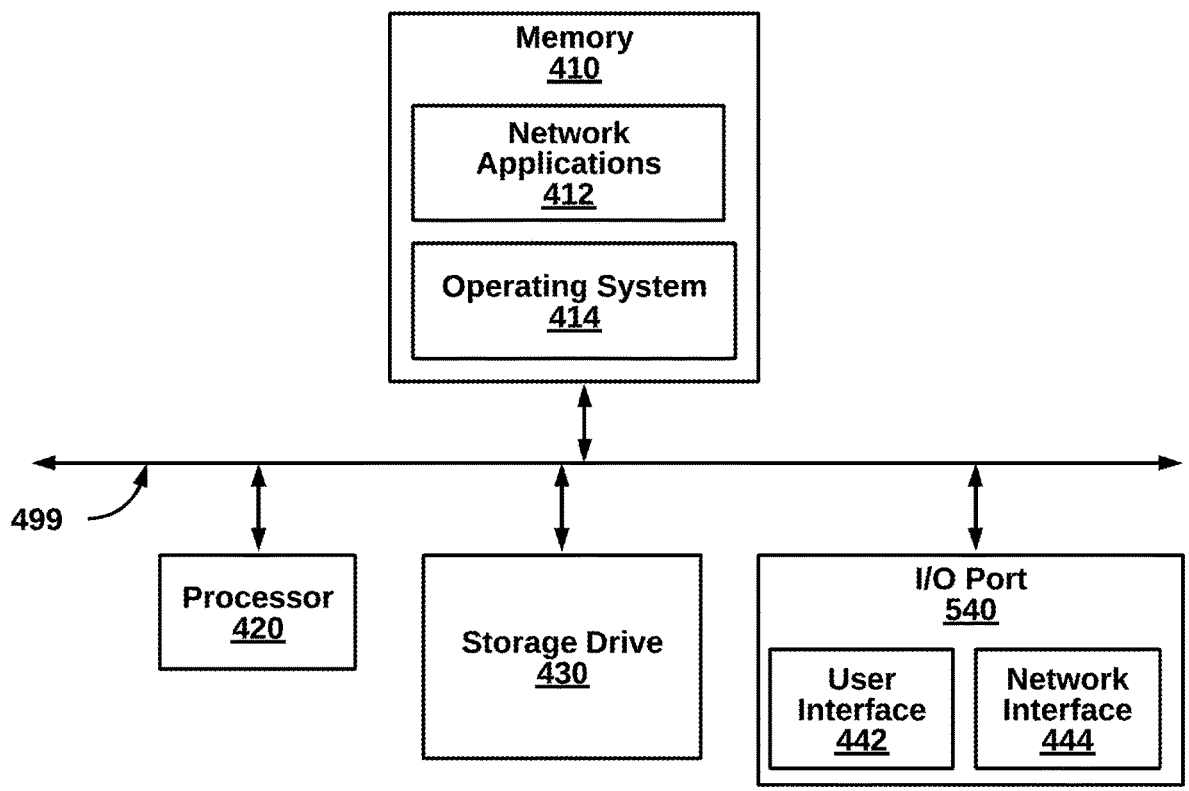
FIG. 4 is a block diagram illustrating an example computing device, according to one embodiment.

FIG. 4 is a block diagram illustrating an example computing device 400 for use in the system 100 of FIG. 1, according to one embodiment. The computing device 400 is implementable for each of the components of the system 100. The computing device 400 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 400, of the present embodiment, includes a memory 410, a processor 420, a storage drive 430, and an I/O port 430. Each of the components is coupled for electronic communication via a bus 499. Communication can be digital and/or analog, and use any suitable protocol.

The memory 410 further comprises network applications 412 and an operating system 414. The network applications 412 can include a web browser, a mobile application, an application that uses networking, a remote application executing locally, a network protocol application, a network management application, a network routing application, or the like.

The operating system 414 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 420 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 430

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in a Wi-Fi controller on a data communication network, for improving computer network security by implementing security policies of a firewall device locally at a plurality of access points, the method comprising the steps of:
   receiving application data collected by an IDS (intrusion detection system) on the data communication network and concerning a plurality of applications executing on each station coupled to the plurality of access points;
   receiving firewall rules for the plurality of applications from a firewall device coupled to the data communication network and providing firewall services to the plurality of access points, including outbound traffic from the plurality of access points;
   parsing the firewall rules to expose configured actions for the plurality of applications;
   preparing a customized application control policy for each particular application for implementation by at least one of the plurality of access points, wherein the customized application policy concerns how the at least one access point prioritizes network traffic for DPI (deep packet inspection) for data packets for a specific application of the plurality of applications of a station based on the firewall rules and application data for the specific application; and
   distributing customized application control policies to the plurality access points based on application traffic handled by each access point.

2. The method of claim 1, further wherein the configured actions comprise one or more of monitor, block, and quarantine.

3. The method of claim 1, further comprising:
   receiving application information from an IPS (intrusion prevention system), the application information comprising at least one of application risk and application popularity.

4. The method of claim 1, wherein the access point applies the firewall rules against a data packet, and responsive to the firewall rules, drops the data packet before reaching the firewall device.

5. The method of claim 1, wherein the network applications is categorized as either high risk or low risk, wherein data packets from high risk applications are prioritized for processing over data packets from low risk applications.

6. The method of claim 1, further comprising:
   updating the firewall rules for applications and updating customized application control polices that are affected.

7. The method of claim 1, further comprising:
   providing less AirTime in a packet prioritization scheme for high risk applications relative to low risk applications.

8. The method of claim 1, further comprising:
   dropping one or more packets at the access point based on firewall rules.

9. The method of claim 1, further comprising:
   dropping one or more packets at the Wi-Fi controller based on firewall rules.

10. The method of claim 1, further comprising:
    dropping one or more packets based on an application generating the traffic.

11. A non-transitory computer-readable medium storing source code that, when executed by a processor, performs a computer-implemented method, in a Wi-Fi controller on a data communication network and implemented at least partially in hardware, for improving computer network security by implementing security policies of a firewall device locally at a plurality of access points, the method comprising the steps of:
    receiving application data collected by an IDS (intrusion detection system) on the data communication network and concerning a plurality of applications executing on each station coupled to the plurality of access points;
    receiving firewall rules for the plurality of applications from a firewall device coupled to the data communication network and providing firewall services to the plurality of access points, including outbound traffic from the plurality of access points;
    parsing the firewall rules to expose configured actions for the plurality of applications;
    preparing a customized application control policy for each particular application for implementation by at least one of the plurality of access points, wherein the customized application policy concerns how the at least one access point prioritizes network traffic for DPI (deep packet inspection) for data packets for a specific application of the plurality of applications of a station based on the firewall rules and application data for the specific application; and
    distributing customized application control policies to the plurality access points based on application traffic handled by each access point.

12. A Wi-Fi controller on a data communication network and implemented at least partially in hardware, for improving computer network security by implementing security policies of a firewall device locally at a plurality of access points, the Wi-Fi controller comprising:
- a processor;
- a network interface, communicatively coupled to the processor; and
- a memory, communicatively coupled to the processor and storing source code, comprising:
    - a first module to receive application data collected by an IDS (intrusion detection system) on the data communication network and concerning plurality of applications executing on each station coupled to the plurality of access points;
    - a second module to receive firewall rules for the plurality of applications from a firewall device coupled to the data communication network and providing firewall services to the plurality of access points, including outbound traffic from the plurality of access points;
    - a third module to parse the firewall rules to expose configured actions for the plurality of applications;
    - a fourth module to prepare a customized application control policy for each particular application for implementation by at least one of the plurality of access points, wherein the customized application policy concerns how the at least one access point prioritizes network traffic for DPI (deep packet inspection) for data packets for a specific application of the plurality of applications of a station based on the firewall rules and application data for the specific application; and
    - a fifth module to distribute customized application control policies to the plurality access points based on application traffic handled by each access point.

* * * * *